United States Patent [19]

Shultz

[11] Patent Number: 5,092,063

[45] Date of Patent: Mar. 3, 1992

[54] PICTURE FRAME

[75] Inventor: Julius Shultz, North White Plains, N.Y.

[73] Assignee: Dox Manufactures, Inc., Orangeburg, N.Y.

[21] Appl. No.: 562,726

[22] Filed: Aug. 6, 1990

[51] Int. Cl.[5] .............................................. A47G 1/06
[52] U.S. Cl. ...................... 40/152; 40/155; 403/295; 403/401
[58] Field of Search ............... 40/152, 152.1, 155, 40/156, 158.1, 159.1; 403/401, 402, 294, 295

[56] References Cited

U.S. PATENT DOCUMENTS

| | | | |
|---|---|---|---|
| 3,200,913 | 8/1965 | Nelson | 403/294 |
| 4,136,470 | 1/1979 | Barz | 40/152 |
| 4,364,192 | 12/1982 | Lloyd | 40/155 |
| 4,525,945 | 7/1985 | Shultz | 40/155 |
| 4,725,083 | 2/1988 | Schauer | 403/295 |
| 4,850,125 | 7/1989 | Green | 40/152 |
| 4,862,612 | 9/1989 | Sugihara et al. | 40/155 |

FOREIGN PATENT DOCUMENTS

| | | | |
|---|---|---|---|
| 2225940 | 12/1973 | Fed. Rep. of Germany | 40/155 |
| 2429108 | 3/1975 | Fed. Rep. of Germany | 40/155 |
| 2942555 | 6/1981 | Fed. Rep. of Germany | 40/152 |
| 1139255 | 1/1969 | United Kingdom | 403/402 |

Primary Examiner—Kenneth J. Dorner
Assistant Examiner—Brian K. Green
Attorney, Agent, or Firm—Schweitzer Cornman & Gross

[57] ABSTRACT

A picture frame comprises a series of abutting frame elements joined by corner pieces. Each of the frame elements includes an aperture into which the artwork and accompanying materials, such as cover glass, mats and the like are received. Flexible arms extend along the frame elements and are biased to retain the artwork within the aperture, and permits the effective retention of artwork of various thicknesses. The corner pieces include pair projections which engage complimentary bores in the frame elements to retain the frame elements in position. A pair of the cover pieces may be of a modified construction to allow removal of a frame elements after assembly to permit changing the artwork. In such embodiment, a single projection, rather than a pair of projections is utilized to engage the removable frame element.

8 Claims, 2 Drawing Sheets

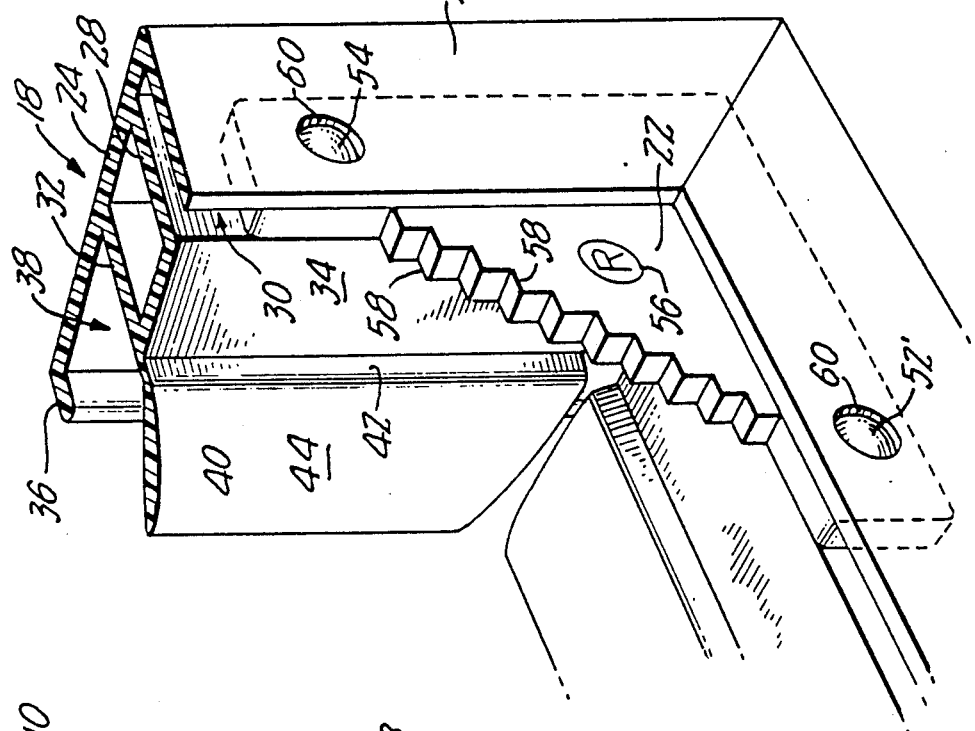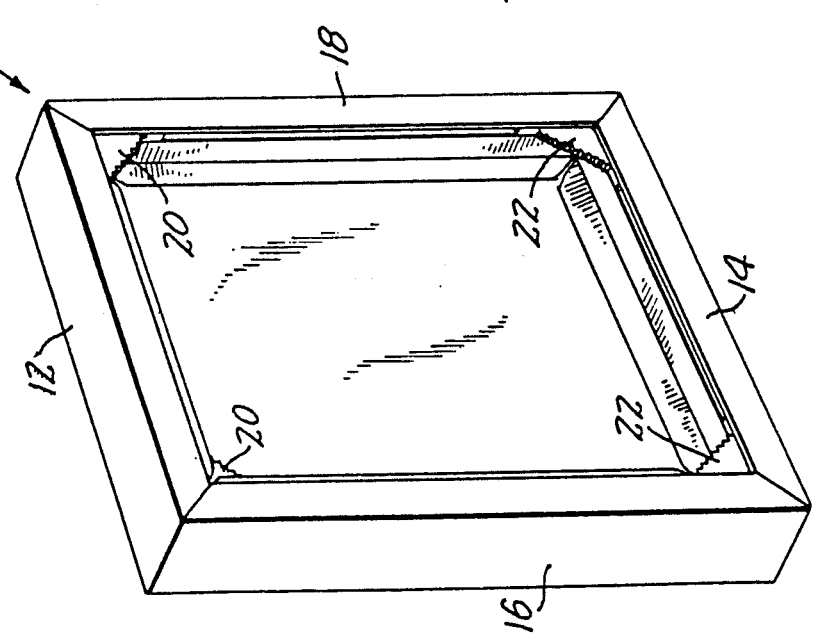

PICTURE FRAME

BACKGROUND OF THE INVENTION

The present invention relates to a new and improved picture frame of the type which utilizes interconnected molded frame elements.

Numerous constructions exist for the mounting and display of artwork, photographs, certificates, diplomas and other sheet-like items. Typically, such constructions create a rectangular frame border about the artwork, supporting both the artwork and related elements, such as mats, protective glass, backing sheets and the like.

Representative of such constructions is the frame depicted in U.S. Pat. No. 4,525,945 to Shultz. That construction utilizes a set of molded edge pieces, joined together by multiple element corner plates which are screwed into place. As is typical with much of the prior art, such a construction requires tools for assembly, and utilizes a plurality of small parts which have the capacity to be lost. In addition, such assemblies are typically designed to accommodate artwork and associated materials having a given, specific thickness. Insertions of lesser thickness, if accommodated at all, require the use of wedges and the like to maintain the artwork in position.

As an alternative to the structure of the '945 patent, U.S. Pat. No. 4,123,863 to Becker utilizes a pivoting connector, which is affixed to one of the frame elements to be joined. While eliminating loose parts, such a construction adds complexity to the frame. It also does not address the problem of accommodation of artwork of differing thickness.

It is accordingly a purpose of the present invention to provide a new and improved frame structure which has the capacity for easy assembly without the necessity for tools.

Yet a further purpose of the present invention is to provide such an assembly which has the capacity to accept artwork compositions of various thickness, and which allows the easy insertion and removal of the artwork.

Still a further purpose of the present invention is to provide such an assembly which may be easily and economically manufactured, and may be provided in a variety of sizes to accommodate a range of artwork.

SUMMARY OF THE INVENTION

In accordance with the above and other objects and purposes, the frame of the present invention comprises a plurality of frame molding sections which are adapted to be connected at their mitered ends to form a continuous frame, typically of rectangular construction. The frame elements are each provided with a longitudinal slot into which the supported edge of the artwork is inserted. The slot is bounded by at least one flexible wall, which is pivotly biased so as to exert a force inwardly towards the slot which retains the inserted artwork in position and accommodates for variations in artwork thickness.

Each of the molded sections are further provided with aligned slots proximate the ends thereof into which a corner joint member may be inserted. The corner joint member spans the molding intersection, and is formed of a flat plate having sets of projections on the opposed faces thereof. These projections interfit with bores in the moldings to provide a locking fit for the joint member, which retains the moldings in position. The number and/or projections may be varied among the corner pieces utilized to facilitate insertion and removal of a given molding element in connection with artwork insertion and removal.

BRIEF DESCRIPTION OF THE DRAWINGS

Additional objects, features and advantages of the present invention will become apparent from the detailed description of a preferred, but nonetheless illustrative embodiment which follows, when considered in conjunction with the annexed figures wherein:

FIG. 1 is a rear perspective view of an assembled frame of the present invention;

FIG. 2 is a detailed rear perspective view of the lower righthand corner of the frame of FIG. 1;

FIG. 3 is an elevation view of a first corner member;

FIG. 4 is an edgewise view of the corner member of FIG. 3;

FIG. 5 is an elevation view of a second form of corner member;

FIG. 6 is an edgewise view thereof;

DETAILED DESCRIPTION OF A PREFERRED EMBODIMENT

Figure 7:
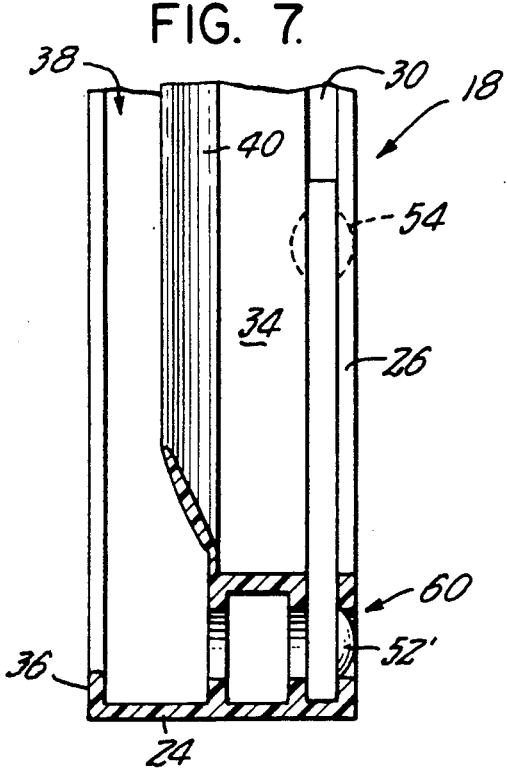
FIG. 7 is a partial bottom plan view, partially broken away, of the corner of FIG. 2, further detailing the interconnection of a corner piece with a molded section.

Referring initially to FIG. 1, a picture frame 10 of the present invention is formed from a plurality of elongated frame molding elements 12,14,16,18 joined together at their ends to form an appropriately-shaped frame unit. Typically, the frame elements are joined to form a frame of rectangular construction, but it is to be recognized that the shape of the frame may be varied as appropriate and desired for the purpose employed. To form a rectangular frame the elements are provided with 45 degree mitered ends, the abutting ends being appropriately joined by first corner pieces 20 at the top of the frame and second corner pieces 22 at the bottom. As shall be explained herein, the second corner pieces may be preferably adapted to facilitate removal of frame element 14 to change the inserted artwork.

As may be best seen in FIG. 2, each of the frame elements 12 through 18 is formed with an outer sidewall 24 and a perpendicular rear wall 26. Spaced inwardly from rear wall 26 and extending parallel thereto is a first inner wall 28 which, with rear wall 26, defines a slot 30 therebetween in which a corner piece, such as piece 22, may be inserted. A second inner wall 32, co-planar with rear wall 26 and first inner wall 28, also extends along the length of the frame element, and may be joined to the first inner wall 28 by inner sidewall 34 to provide extra rigidity to the structure. The outer sidewall 24 terminates at the front of the frame with an inwardly directed wall or lip 36 which, in conjunction with second inner wall 32, defines a longitudinally-extending aperture or channel 38 into which the edge of inserted artwork and the like is placed and retained.

Extending towards the interior of the assembled frame from the inner edge of second inner wall 32 is longitudinally-extending arm 40. Arm 40 is preferably formed integrally with the frame element 18 and includes an intermediate section 42 of somewhat reduced thickness which serves as a hinge, imparting flexibility to the main portion 44 of the arm. The arm 40 is further fabricated to be angularly directed in the direction of the front of the frame and towards the plane of front lip 38. The ends of the arms 40 may be mitered to avoid interference with each other upon assembly of the frame.

Referring next to FIGS. 3 through 6, the corner pieces of the present invention are preferably of two types, differing in the means provided to engage the plates with the frame elements. Both types of corner pieces are of generally triangular configuration, having a pair of perpendicular leg portions 46,48 and a central fillet 50, and are advantageously formed of an appropriate plastic. The thickness of the plates is chosen to interfit within the aligned slot 30 in the abutting frame elements.

The first corner piece 20, as depicted in FIGS. 5 and 6, bears opposed pairs of generally hemispherical protrusions 52,52 and 54,54 on the arms 46,48, equidistantly spaced from the right angle corner of the piece. Second corner elements 22 similarly bear the opposed projections 54, but further include only one of the projections 52, located on the plate surface which bears against rear wall 26 on the completed structure. This projection 52' may be of slightly reduced diameter than the other projections, which are all of equal size. Because of this configuration, the second corner pieces 22 must be formed as right and left side elements, the left side element being a mirror image of the right side. Accordingly, the right and left pieces are provided with appropriate indicia, such as a letter 56, to identify the element. Each of the corner pieces 20,22 may be provided with a stair-step edge along the fillet 50 to serve as an aid for mounting the completed frame.

To provide a locking function between abutting frame elements and the corner pieces, each frame element is provided with a transverse bore 60 through rear wall 26 and first inner wall 28, aligned with the protrusions 52,54 on the fully inserted corner pieces, as seen in FIG. 2. The diameter of the bore is equal to the diameter of the full size protrusions 52,54.

Assembly of the frame commences with the insertion of the first corner pieces 20 into the top frame element 12. Because the first corner pieces 20 are symmetrical, they are simply inserted into the slot 30 such that a pair of the projections 52,52 or 54,54 engage the transverse bores 60 in the walls 26 and 28.

With the first corner pieces so inserted, a side frame element, such as 16 or 18, may be joined to the top element 12, the protrusions 52 (or 54) on the exposed arm portion of the corner piece again mating with the bore 60 on the side element to maintain the corner piece in position and retain the frame elements in an abutting relation.

Figure 10:
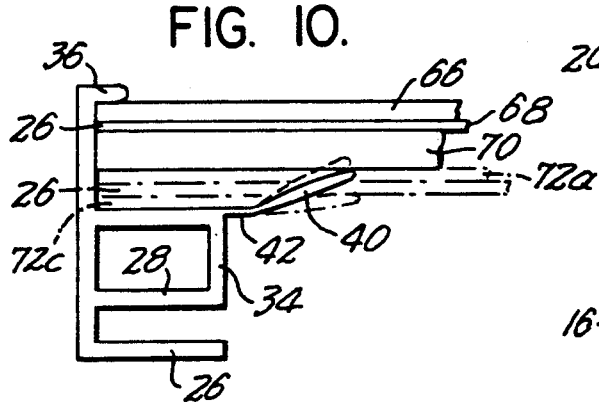
FIG. 10 is a diagrammatic view of a portion of a frame depicting the maintenance of the artwork therein.

With three sides of the frame connected, the artwork may be inserted into the partially completed frame through the open side between the front lip 36 and second inner wall 32. As depicted in FIG. 10, the inserted artwork, which typically may include cover glass 62, art 64 and backing board 66 elements, is maintained against the inner face of front lip 36 by the spring action of the arm 40, and which also allows the insertion of artwork of various thicknesses, as depicted by additional elements 68a-c, the integral hinge section 42 of the arm allowing the arm to flex away from lip 36 as required to accommodate the artwork insertion while maintaining a bias towards the lip to hold the inserted work rigidly in place.

Figure 8:
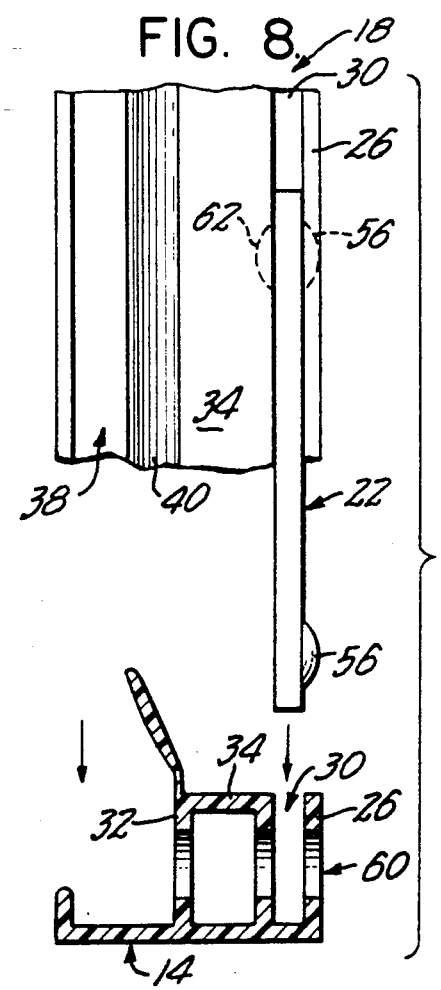
FIG. 8 is an elevation view depicting assembly of the corner of FIG. 2.
Figure 9:
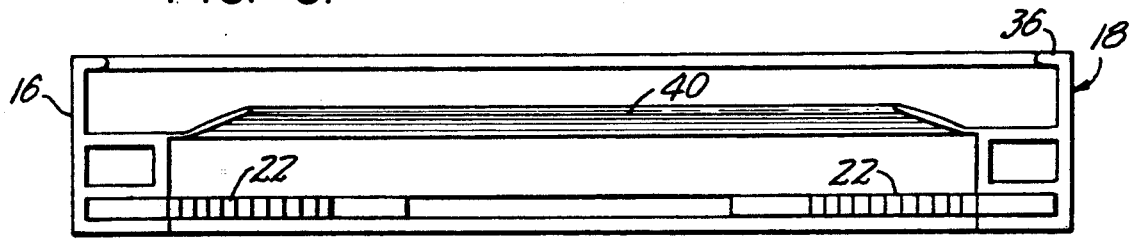
FIG. 9 is a sectional view of a completed frame.

With the artwork inserted, the remaining bottom frame element 14 can be connected. As shown in FIG. 7, a "right side" corner element 22 is inserted into the lower end of the side element 18, the pair of protrusions 54, on the opposed faces of arm 46 engaging the bore 60 on the side frame element 18. A similar procedure is performed with respect to the left side frame element 16, using a mirror image "left side" corner element 22. Frame assembly is completed by connection of the bottom frame element 14, the arms 48 of the corner pieces 22 bearing the single protrusions 52' engaging the bores 60 on the bottom frame member, as depicted in FIG. 8.

As completed, the frame elements are rigidly maintained in their abutting position by use of the corner elements. Because the bottom corner elements 22 do not include opposed protrusions on their arms engaging the bottom element 14, however, the bottom element 14, while being retained rigidly in place, may still be disconnected from the remaining portions of the assembly with relative ease by forcing the frame element outwardly, disengaging the protrusions 52' from their respective bores 60 to allow the insertion and removal of artwork as required. The remaining frame elements are engaged with greater rigidity due to the opposed projections, and thus maintain the shape and integrity of the frame as the bottom element is removed.

Figure 11:
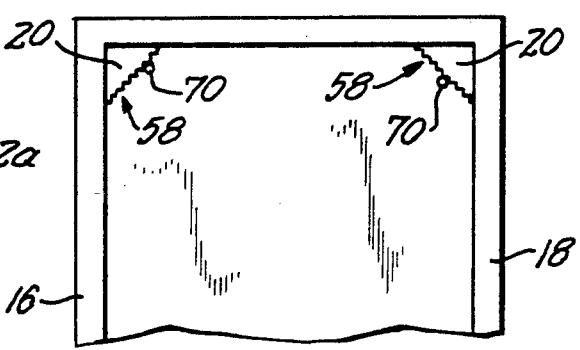
FIG. 11 is a rear elevation view of a portion of an assembled frame illustrating a mechanism by which the frame may be mounted.

The completed frame may be mounted on a wall by the use of a pair of nails or similar devices 70 as seen in FIG. 11. The serrations 58 on the corner pieces allows compensation for any irregularities in placement of the nails.

I claim:

1. A frame for the mounting of artwork, comprising a plurality of elongated frame elements each having first and second ends, said frame elements adapted to abut at adjacent ends to form a closed frame construction; each of said frame elements having a rear wall and a first inner wall parallel thereto, and a longitudinally-extending artwork-accepting channel therein, said artwork-accepting channel being formed by a pair of parallel-spaced channel wall members, one of said channel wall members comprising a pivotally mounted arm biased towards the other of said channel wall members; each of said frame elements having a second channel formed at its ends by said rear wall and first inner wall; and a plurality of corner pieces inserted within said second channels of abutted frame elements, said corner pieces having engagement protrusions thereon adapted and positioned to engage complimentary engagement means in the form of transverse bores through said rear and first inner walls on said abutted frame elements to maintain said corner pieces in place, whereby said closed frame construction is formed.

2. The frame of claim 1, wherein said second channel extends from the first end of said frame element to the second end thereof.

3. The frame of claim 1, wherein said frame elements each include a front lip and a second inner wall parallel thereto, said artwork-accepting channel being formed by said lips and said second inner wall, said second inner wall including said pivotly mounted arm.

4. The frame of claim 3, wherein said first and second inner walls are joined by an inner sidewall.

5. The frame of claim 1, wherein said corner pieces are of plate-like construction and said protrusions are located on the opposite faces thereof.

6. The frame of claim 5, wherein two of said corner pieces have a set of protrusions on the opposite faces thereof adapted to fixedly engage a frame element and a single protrusion adapted to releasably engage a second frame element, whereby said second frame element is releasably joined by said two corner pieces to the abutting frame elements.

7. The frame of claim 6, wherein said single protrusion is smaller than said set of protrusions.

8. A picture frame, comprising top, first and second side and bottom elongated molded elements adapted to abut each other at their ends, each of said molded elements having a longitudinally-extending artwork-accepting channel bounded by a peripheral lip and an internal wall, said internal wall comprising a flexibly-mounted arm biased towards said peripheral lip and overlying said channel, said top element being joined to said first and second side elements by a pair of planar corner pieces having first and second pairs of projections aligned on opposite faces thereof and adapted to engage complimentary bores on said top and first and second sides, said bottom element being removably connected to said first and second side elements by a pair of planar corner pieces having a pair of projections aligned on opposite faces thereof and adapted to engage complimentary bores on said firs and second side elements and a single projection of a smaller diameter than the diameter of said pairs of projections adapted to engage a bore on said bottom element, each of said molded elements further having a pair of walls defining a corner-accepting channel to accept said corner pieces, said bores all being of equal diameter and being located on said pair of channel-defining walls.

* * * * *